(12) United States Patent
Ardavanis et al.

(10) Patent No.: US 9,387,998 B2
(45) Date of Patent: Jul. 12, 2016

(54) METHOD AND KIT FOR TRANSFERRING PIPES FROM A CARRIER VESSEL TO AN UNDERWATER-PIPELINE LAYING VESSEL

(75) Inventors: Kimon Ardavanis, Sanremo (IT); Edoardo Rolla, Bussero (IT)

(73) Assignee: SAIPEM S.p.A., San Donato Milanese (IT)

( * ) Notice: Subject to any disclaimer, the term of this patent is extended or adjusted under 35 U.S.C. 154(b) by 495 days.

(21) Appl. No.: 13/823,965

(22) PCT Filed: Dec. 29, 2010

(86) PCT No.: PCT/IB2010/003362
§ 371 (c)(1),
(2), (4) Date: Jun. 3, 2013

(87) PCT Pub. No.: WO2012/038776
PCT Pub. Date: Mar. 29, 2012

(65) Prior Publication Data
US 2013/0272821 A1    Oct. 17, 2013

(30) Foreign Application Priority Data

Sep. 24, 2010 (IT) .................................. MI10A1739

(51) Int. Cl.
*B63B 27/00* (2006.01)
*B65G 67/60* (2006.01)
(Continued)

(52) U.S. Cl.
CPC ............. *B65G 67/60* (2013.01); *B25J 15/0047* (2013.01); *B25J 15/024* (2013.01);
(Continued)

(58) Field of Classification Search
CPC ... B65G 67/60; B65G 67/603; B25J 15/0047; B25J 15/024; B25J 15/0616; B63B 27/30; B63B 35/00; B63B 35/03; B63B 27/10; B66C 1/10; B66C 1/427; B66C 23/52; B66C 1/28; B66C 1/32; B66C 1/485; B66C 1/62; B66C 1/66
USPC ............. 414/142.7, 800, 137.9, 22.51–22.71, 414/138.5, 910, 803; 211/70.4
See application file for complete search history.

(56) References Cited

U.S. PATENT DOCUMENTS 2,789,716 A * 4/1957 Wolf .............................. 414/626
2,905,501 A * 9/1959 Jakubowski ................. 294/81.3
(Continued)

FOREIGN PATENT DOCUMENTS

CN    87 1 06443 A    6/1988
CN    1350499 A    5/2002
(Continued)

OTHER PUBLICATIONS

International Search Report and Written Opinion for International Appl. No. PCT/IB2010/003362, European Patent Office, The Netherlands, mailed on Jul. 25, 2011, 11 pages.
(Continued)

*Primary Examiner* — Saul Rodriguez
*Assistant Examiner* — Lynn Schwenning
(74) *Attorney, Agent, or Firm* — Sterne, Kessler, Goldstein & Fox P.L.L.C.

(57) ABSTRACT

A method of transferring pipes from a carrier vessel to a laying vessel includes gripping the pipes in the hold of the carrier vessel and releasing the pipes, in a given position, inside a transfer station on the carrier vessel by means of a manipulator mounted on the carrier vessel. The method also includes guiding a gripping device, connected to a crane, into said given position at the transfer station.

22 Claims, 11 Drawing Sheets

(51) Int. Cl.
B25J 15/00 (2006.01)
B25J 15/02 (2006.01)
B25J 15/06 (2006.01)
B63B 27/30 (2006.01)
B63B 35/00 (2006.01)
B66C 1/10 (2006.01)
B66C 1/42 (2006.01)
B66C 23/52 (2006.01)
B63B 27/10 (2006.01)
B63B 35/03 (2006.01)

(52) U.S. Cl.
CPC ............ B25J 15/0616 (2013.01); B63B 27/30 (2013.01); B63B 35/00 (2013.01); B66C 1/10 (2013.01); B66C 1/427 (2013.01); B66C 23/52 (2013.01); B63B 27/10 (2013.01); B63B 35/03 (2013.01)

(56) References Cited

U.S. PATENT DOCUMENTS

| | | | | |
|---|---|---|---|---|
| 3,877,583 A | * | 4/1975 | Bokenkamp | 414/22.54 |
| 4,129,221 A | * | 12/1978 | Moller | 414/22.57 |
| 4,317,524 A | * | 3/1982 | Andersson | B63B 27/10 |
| | | | | 212/261 |
| 4,358,143 A | * | 11/1982 | Cullen | 414/626 |
| 4,563,031 A | * | 1/1986 | Kishimoto et al. | 294/81.21 |
| 5,074,528 A | * | 12/1991 | Long, Jr. | 254/285 |
| 5,562,394 A | * | 10/1996 | Brown, Jr. | 414/626 |
| 6,517,290 B1 | * | 2/2003 | Poldervaart | 405/224.2 |
| 6,705,414 B2 | * | 3/2004 | Simpson et al. | 175/52 |
| 6,817,914 B2 | * | 11/2004 | Breivik | 441/4 |
| 6,964,552 B1 | * | 11/2005 | Krabbendam | B63B 27/10 |
| | | | | 414/137.1 |
| 2006/0169617 A1 | * | 8/2006 | Knight | B65D 88/129 |
| | | | | 206/443 |
| 2008/0202812 A1 | * | 8/2008 | Childers et al. | 175/52 |
| 2011/0170988 A1 | * | 7/2011 | Perry et al. | 414/138.2 |
| 2011/0315446 A1 | * | 12/2011 | Salthaug | E21B 19/155 |
| | | | | 175/52 |

FOREIGN PATENT DOCUMENTS

| | | |
|---|---|---|
| CN | 101626948 A | 1/2010 |
| CN | 101627245 A | 1/2010 |
| DE | 33 15 888 A1 | 11/1984 |
| EP | 1 265 017 A1 | 12/2002 |
| FR | 2 313 256 A1 | 12/1976 |
| WO | WO 2009/118364 A1 | 10/2009 |

OTHER PUBLICATIONS

International Preliminary Report on Patentability for International Appl. No. PCT/IB2010/003362, European Patent Office, Munich, mailed on Dec. 17, 2012, 21 pages.

* cited by examiner

METHOD AND KIT FOR TRANSFERRING PIPES FROM A CARRIER VESSEL TO AN UNDERWATER-PIPELINE LAYING VESSEL

TECHNICAL FIELD

The present invention relates to a carrier vessel for supplying pipes to an underwater-pipeline laying vessel.

More specifically, the present invention relates to a carrier vessel comprising a single- or multiple-hull floating structure, and a hold formed in the floating structure to house a number of pipes for supply to a laying vessel.

BACKGROUND ART

A laying vessel normally comprises an assembly line for joining pipes into an underwater pipeline; and a laying ramp for laying the pipeline as the pipes are joined. Underwater pipelines are normally laid on the bed of a body of water, are used for conducting hydrocarbons, and extend for hundreds of kilometers. The pipes the pipeline is made from are normally of standard 12-meter lengths, which means the laying vessel can only carry a small percentage of the pipes needed to construct the pipeline, and must be supplied periodically with pipes from a carrier vessel. The hold of the carrier vessel is open at the top and designed to house the pipes, which are transferred from the carrier vessel to the laying vessel by positioning the carrier vessel alongside the laying vessel, and lifting and transferring the pipes by means of a crane installed on the laying vessel and equipped with a pipe gripping device. The crane normally has a reach covering the whole of the carrier vessel hold. And, because the crane employs hoisting cables and the swinging movement of the gripping device makes it difficult to position accurately, the gripping device must be positioned and attached to the pipes by workers inside the hold.

The above transfer method has various drawbacks, particularly when working in rough water. Firstly, the rougher the water, the more hazardous the working conditions inside the hold; so much so that it is standard practice to suspend transfer operations over and above a given wave height.

Secondly, transfer is relatively slow and subject to stoppages in rough water conditions.

DISCLOSURE OF INVENTION

It is an object of the present invention to provide a carrier vessel designed to make pipe transfer safer.

Another object of the present invention is to provide a carrier vessel designed to permit pipe transfer even in very rough water conditions, while at the same time ensuring worker safety.

According to the present invention, there is provided a carrier vessel for supplying pipes to a laying vessel, the carrier vessel comprising a weather deck; a hold for housing the pipes; at least one transfer station for temporarily housing the pipes in a given position, and for guiding a gripping device connected to a crane; and at least one manipulator for gripping the pipes in the hold and releasing the pipes, in said given position, inside the transfer station.

The manipulator thus grips the pipes with no assistance from workers inside the hold, and transfers the pipes to the transfer station. Because the manipulator is installed on the carrier vessel, no problems are posed by relative motion between the manipulator and the pipes in the hold, or between the manipulator and the transfer station, whose position is fixed on the carrier vessel. The pipes can thus be extracted automatically from the hold and loaded temporarily into the transfer station, which may be designed to guide the gripping device of the crane.

In a preferred embodiment of the present invention, the transfer station comprises a guide system for positioning the gripping device with respect to said given position.

The guide system provides for positioning the gripping device of the crane, and automatically gripping the pipes at the transfer station.

In a preferred embodiment of the present invention, the manipulator comprises a knuckle-boom crane designed to reach any point within the hold.

The knuckle-boom crane provides for easy handling, combined with a high degree of positioning precision.

For maximum safety, the pipes are gripped by at least partly inserting gripping members inside them.

According to the present invention, to grip the pipes, plugs are removed from the opposite ends of the pipes, preferably by means of unplugging devices associated with the gripping members.

In a preferred embodiment of the present invention, the manipulator is designed to grip a number of parallel pipes simultaneously.

Another object of the present invention is to provide a method of transferring pipes from a carrier vessel to a laying vessel, designed to eliminate the drawbacks of the known art.

According to the present invention, there is provided a method of transferring pipes from a carrier vessel to a laying vessel, the method comprising the steps of gripping the pipes in the hold of the carrier vessel, and releasing the pipes, in a given position, inside a transfer station on the carrier vessel using a manipulator mounted on the carrier vessel; and guiding a gripping device, connected to a crane, into said given position at the transfer station.

The present invention also relates to a kit installable on existing vessels to simplify pipe transfer.

According to the present invention, there is provided a kit for transferring pipes, the kit comprising a gripping device for gripping the pipes and connectable to a crane; and a transfer station for housing the pipes temporarily in a given position, and for guiding the gripping device into a given position.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
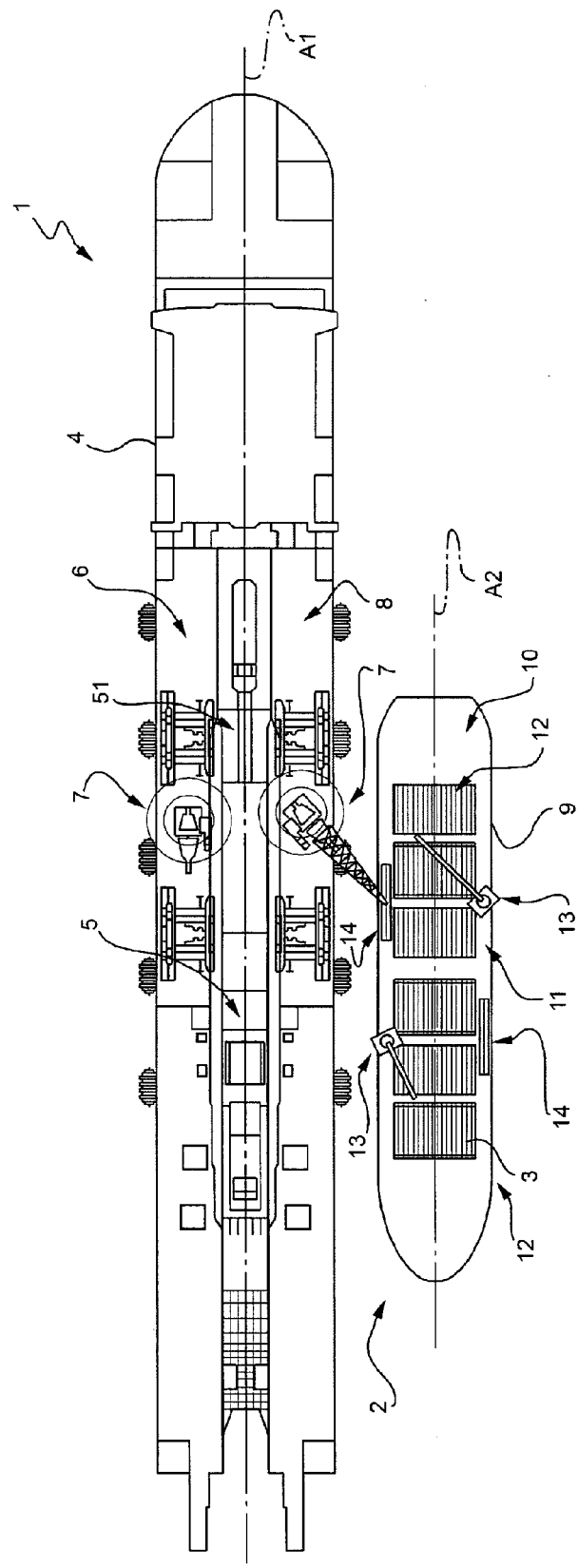
FIG. 1 shows a plan view, with parts removed for clarity, of a carrier vessel alongside and transferring pipes to an underwater-pipeline laying vessel.

In FIG. 1, number 1 indicates a laying vessel for laying an underwater pipeline (not shown), and number 2 a carrier vessel for supplying pipes 3 to laying vessel 1. In the example shown, laying vessel 1 extends along an axis A1, is designed for S-configuration laying, and comprises a floating structure 4; an assembly line 5 for assembling pipes 3 into the pipeline (not shown); a weather deck 6; two cranes 7 on opposite sides of weather deck 6; and an area 8 of weather deck 6, in which to store pipes 3.

Carrier vessel 2 extends along an axis A2, is positioned alongside laying vessel 1 to transfer pipes 3, and comprises a floating structure 9; a weather deck 10; an open hold 11—in the example shown, comprising two compartments 12; two manipulators 13; and two transfer stations 14. The number of manipulators 13 and transfer stations 14 depends on the geometry and size of carrier vessel 2. For some carrier vessels 2, one manipulator 13 and one transfer station 14 may be sufficient.

In the example shown, compartments 12 of hold 11 are arranged successively along axis A2 of carrier vessel 2. Each manipulator 13 and each transfer station 14 are associated with a respective compartment and located on opposite sides of carrier vessel 2.

In the example shown, the pipes are arranged in three stacks of parallel, equally spaced pipes 3.

Figure 2:
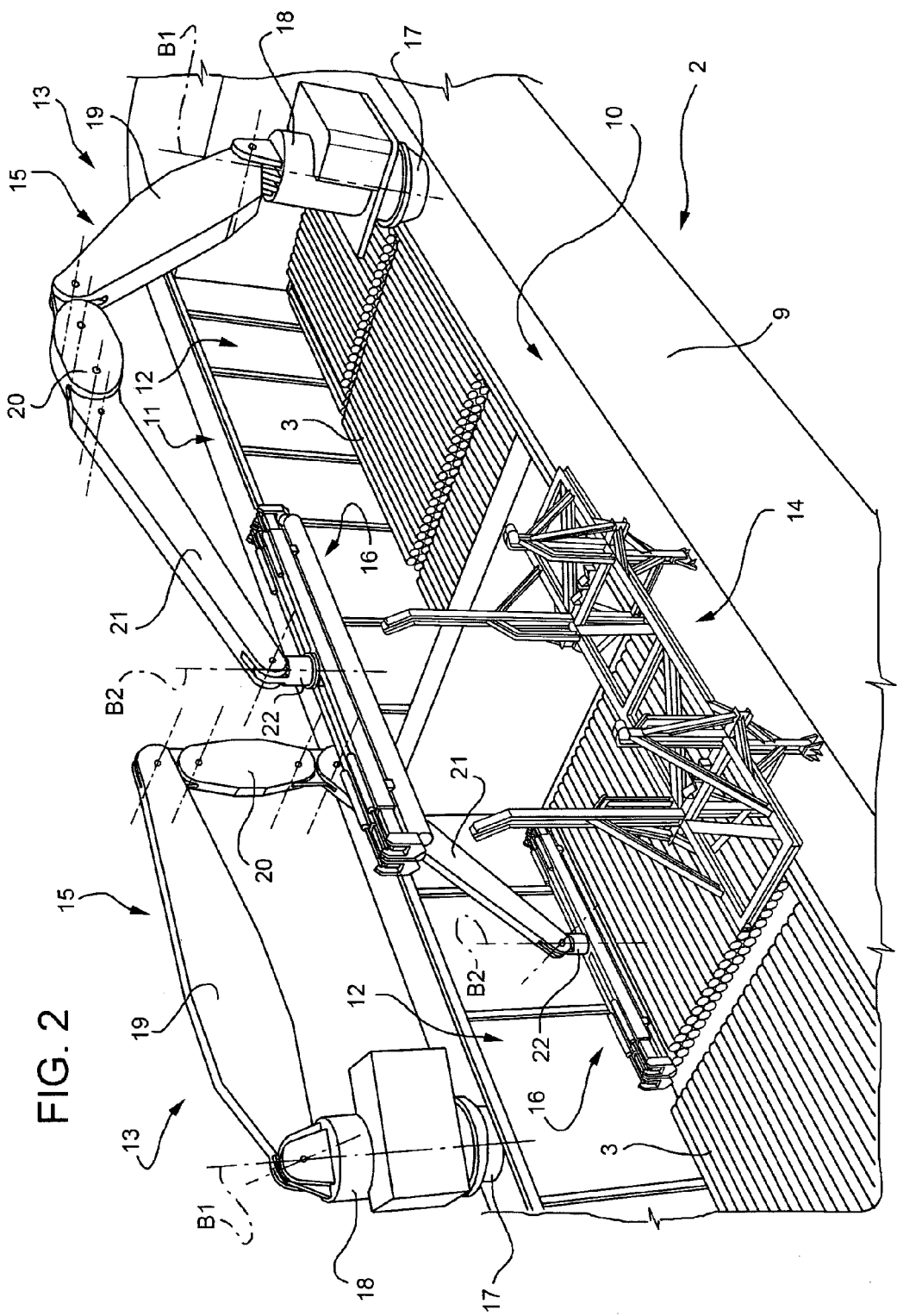
FIG. 2 shows a larger-scale view in perspective, with parts removed for clarity, of the FIG. 1 carrier vessel.

With reference to FIG. 2, each manipulator 13 comprises a knuckle-boom crane 15, and a gripping device 16.

Knuckle-boom crane 15 comprises a base 17 fixed to weather deck 10, alongside a compartment 12; a turret 18 which rotates with respect to base 17 about an axis B1 perpendicular to weather deck 10; and four arms 19, 20, 21, 22 arranged successively, and of which arm 19 is hinged to turret 18, and arms 19, 20, 21 and 22 are hinged to each other about respective axes crosswise to axis B1. Gripping device 16 is fitted to the end of arm 22 to rotate about an axis B2.

Knuckle-boom crane 15 can position gripping device 16 anywhere within respective compartment 12, to pick up pipes 3 however they are positioned.

Figure 3:
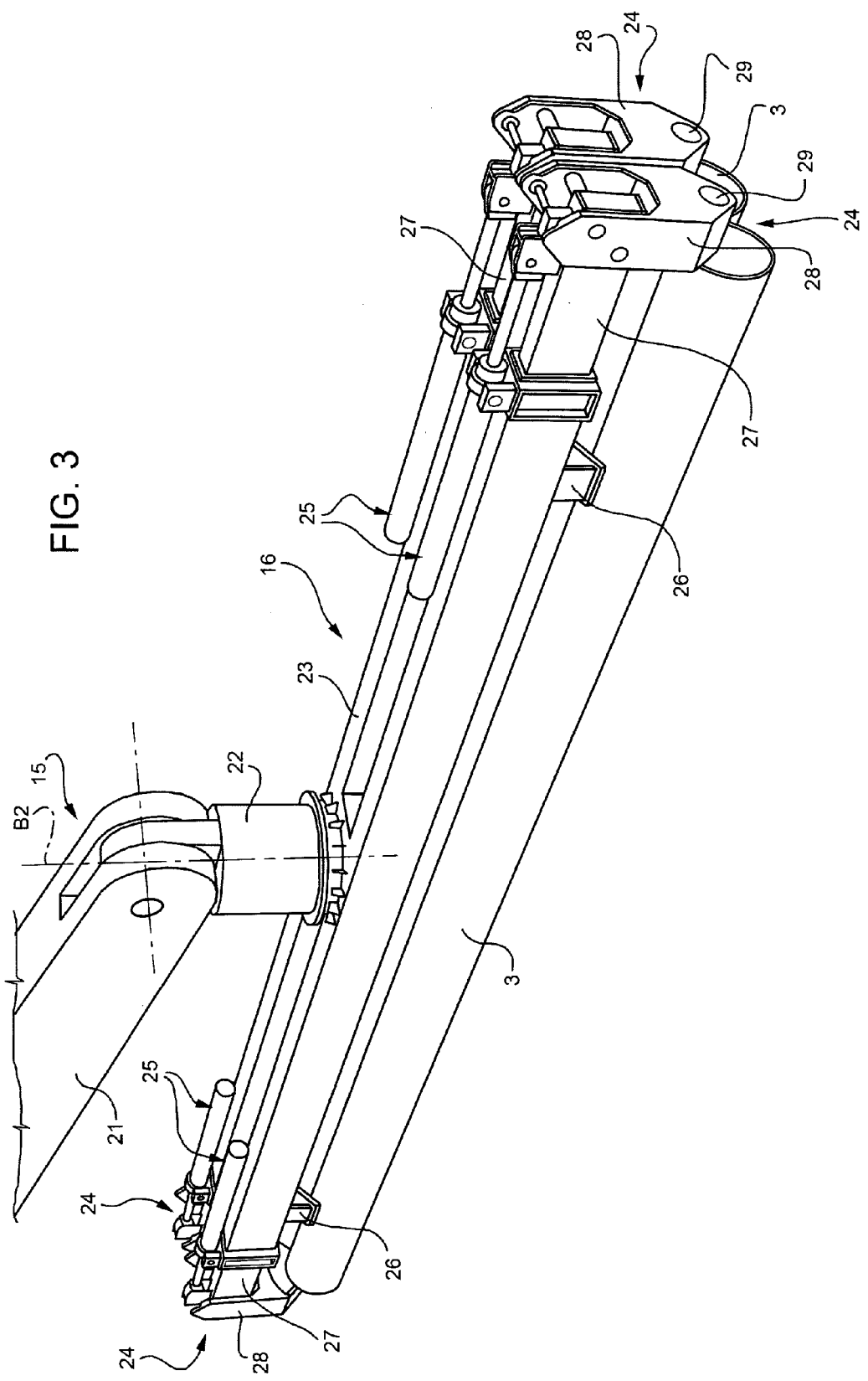
FIG. 3 shows a larger-scale view in perspective, with parts removed for clarity, of a gripping device of the FIG. 2 carrier vessel.

With reference to FIG. 3, gripping device 16 is designed to pick up two side by side, parallel pipes 3 simultaneously, and comprises an elongated structure 23 hinged to arm 22 about axis B2; two gripping members 24 for each pipe 3, fitted to opposite ends of elongated structure 23 and movable with respect to elongated structure 23; an actuator 25 for each gripping member 24; and saddles 26 fitted to elongated structure 23, and which rest on pipes 3 to align gripping member 16 with pipes 3. Each gripping member 24 comprises a bar 27 fitted telescopically to elongated structure 23; a head 28 fitted to the free end of bar 27; and a pin 29 fitted to head 28 and designed for insertion inside pipe 3, as shown in FIG. 7.

Figure 7:
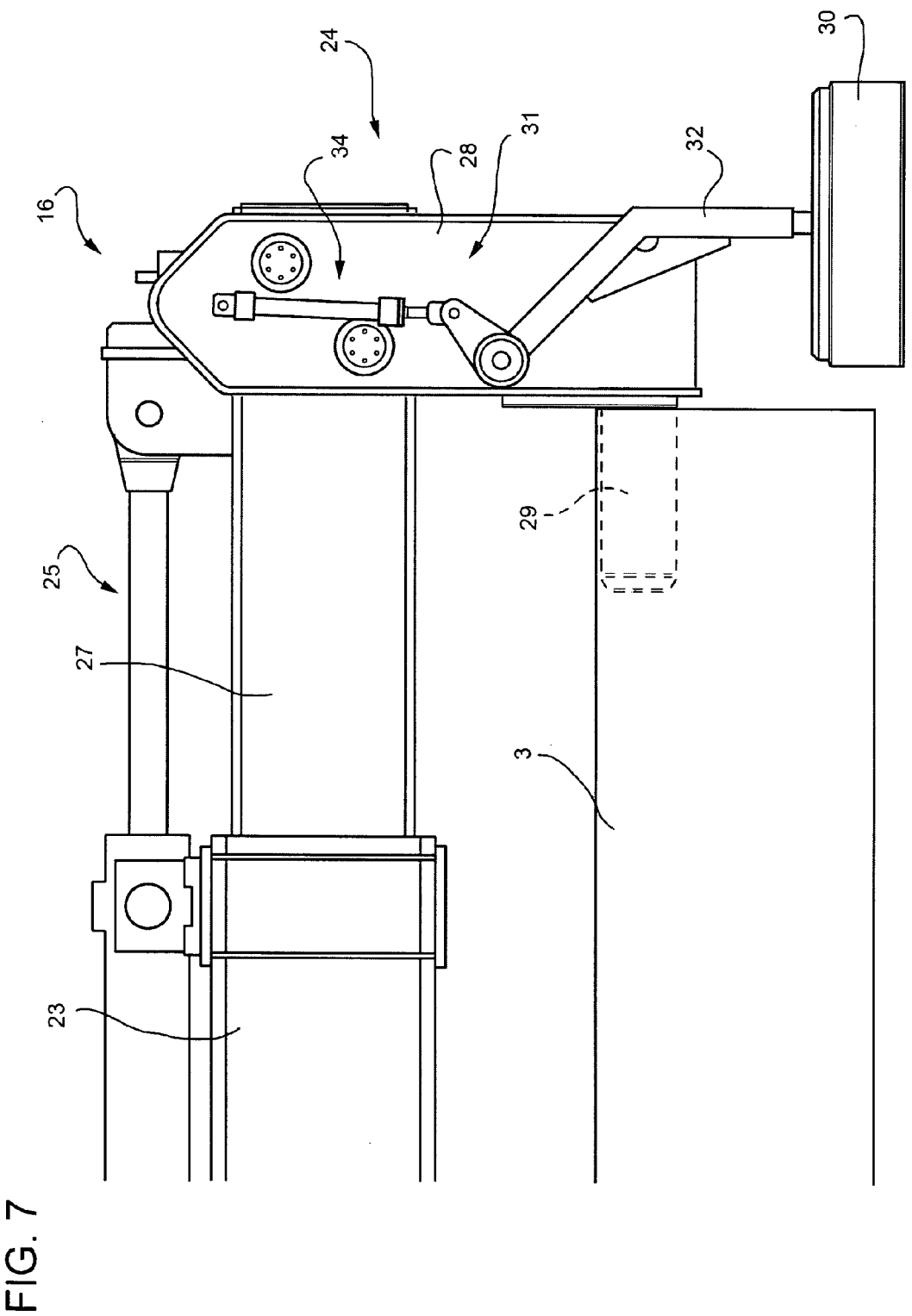

In addition to gripping device 16 gripping pipe 3, FIGS. 4 to 7 also show removal of a plug 30 from the end of pipe 3. Very often, pipes 3 are fitted at opposite ends with protective plugs 30, so gripping device 16 is equipped with an unplugging device 31. In the example shown, each gripping member 24 is associated with an unplugging device 31, which comprises an arm 32 hinged to head 28; a suction cup 33 fitted to arm 32; and an actuator 34 for positioning arm 32 parallel to pin 29, with suction cup 33 positioned in front of the free end of pin 29, and for moving arm 32 and suction cup 33 into a rest position clearing the way for insertion of pin 29 inside pipe 3, as shown in FIG. 7.

Figure 4:
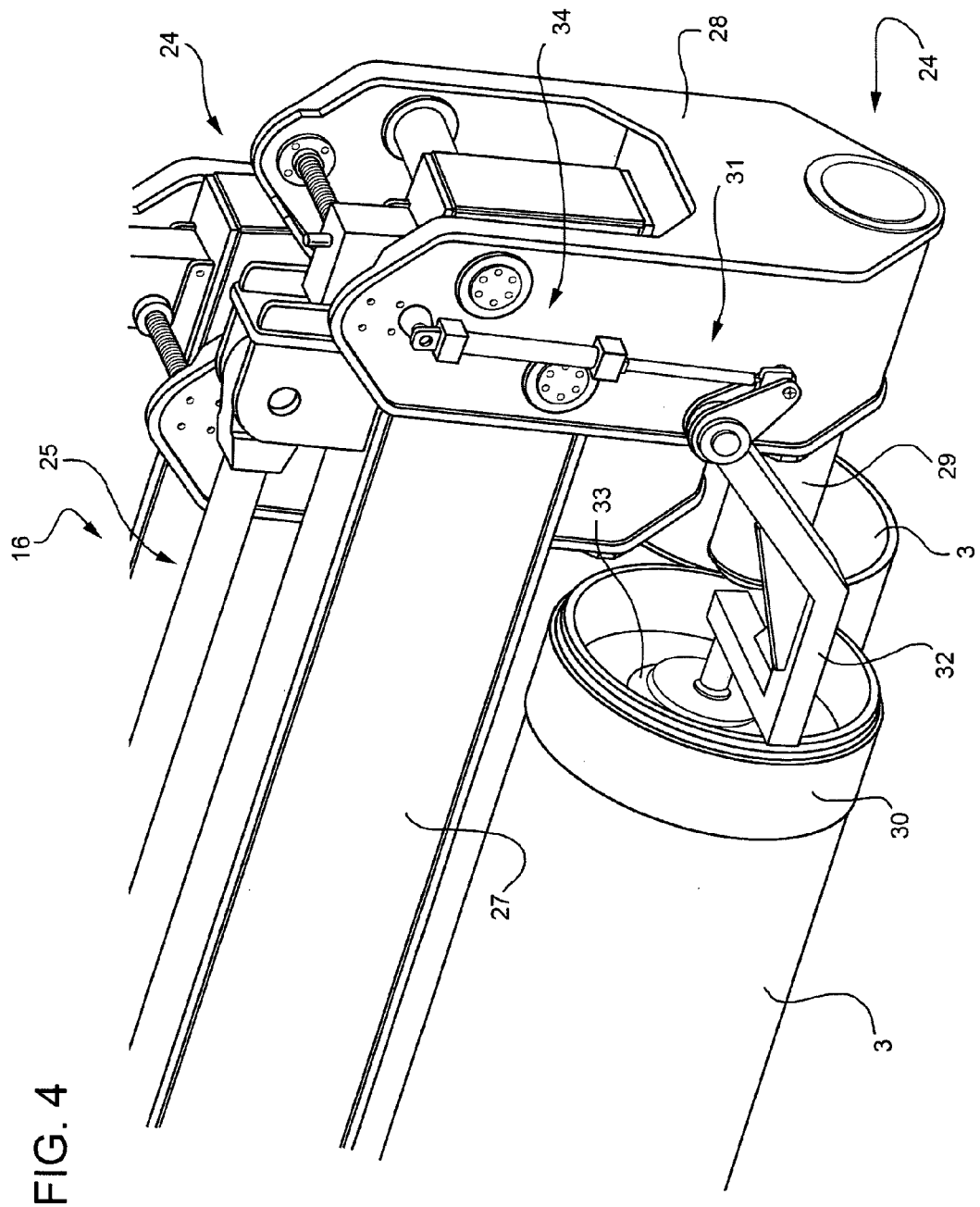
FIGS. 4-7 show larger-scale views in perspective, with parts removed for clarity, of the carrier vessel gripping device at successive pipe gripping stages.
Figure 5:
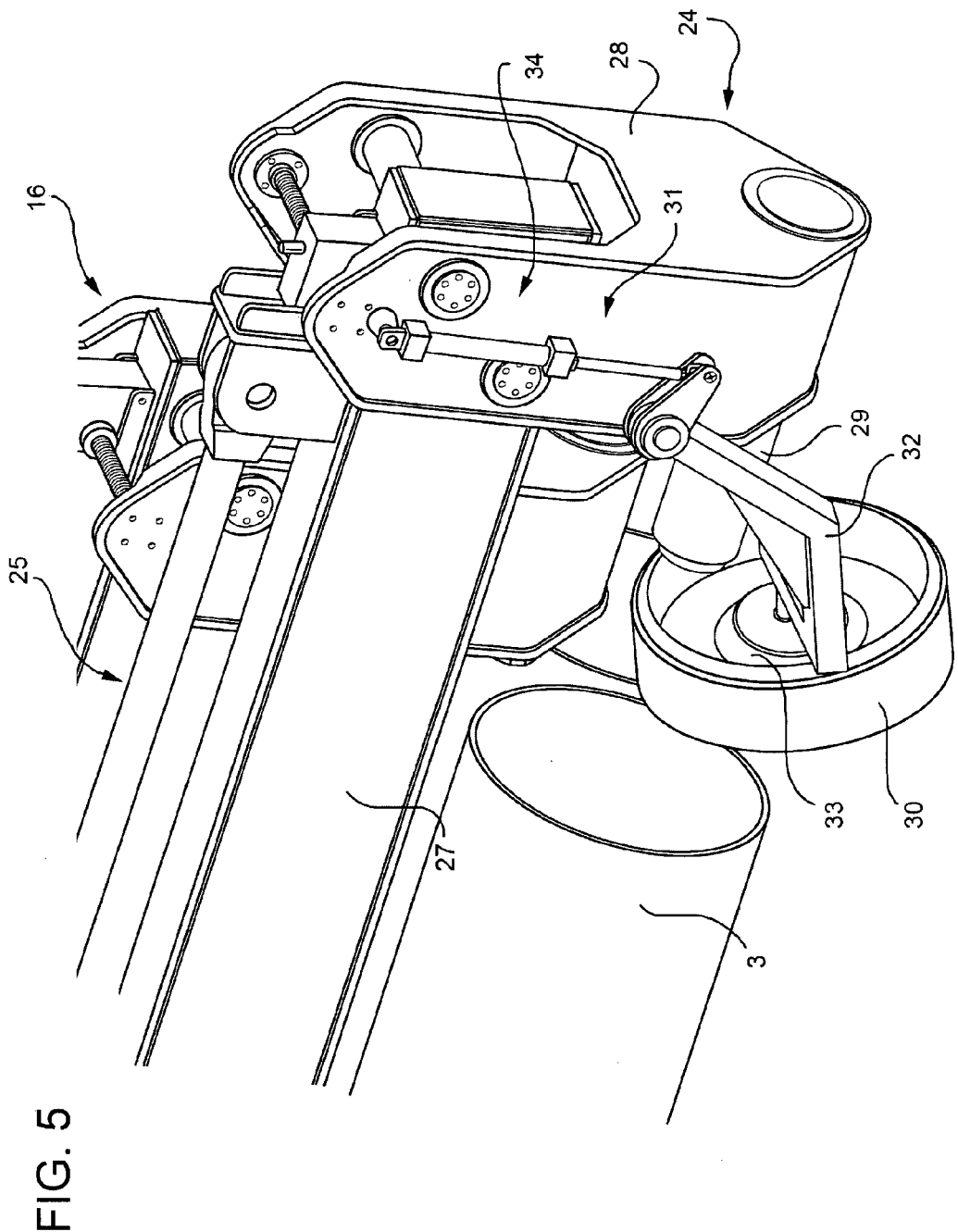
Figure 6:
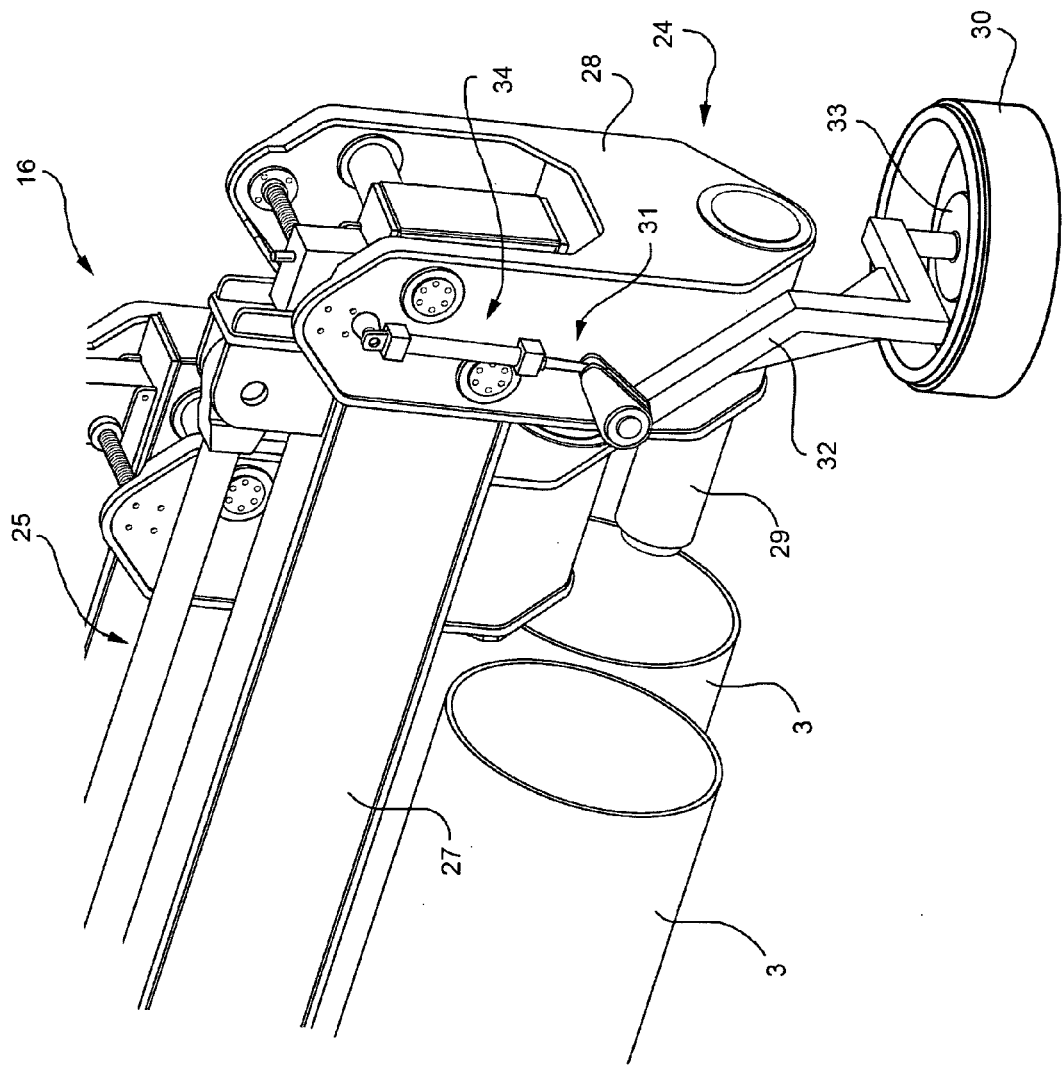

Plug 30 is removed by a coordinated movement of gripping member 24 and unplugging device 31: when arm 32 and suction cup 33 are set to the work position shown in FIG. 4, gripping member 24 is moved forward towards plug 30 to attach suction cup 33 to plug 30; gripping member 24 is then withdrawn from pipe 3 to extract plug 30 from pipe 3; and arm 32, suction cup 33, and plug 30 are moved into the rest position (FIGS. 5 and 6) to allow gripping member 24 to engage pipe 3, as shown in FIG. 7.

Figure 8:
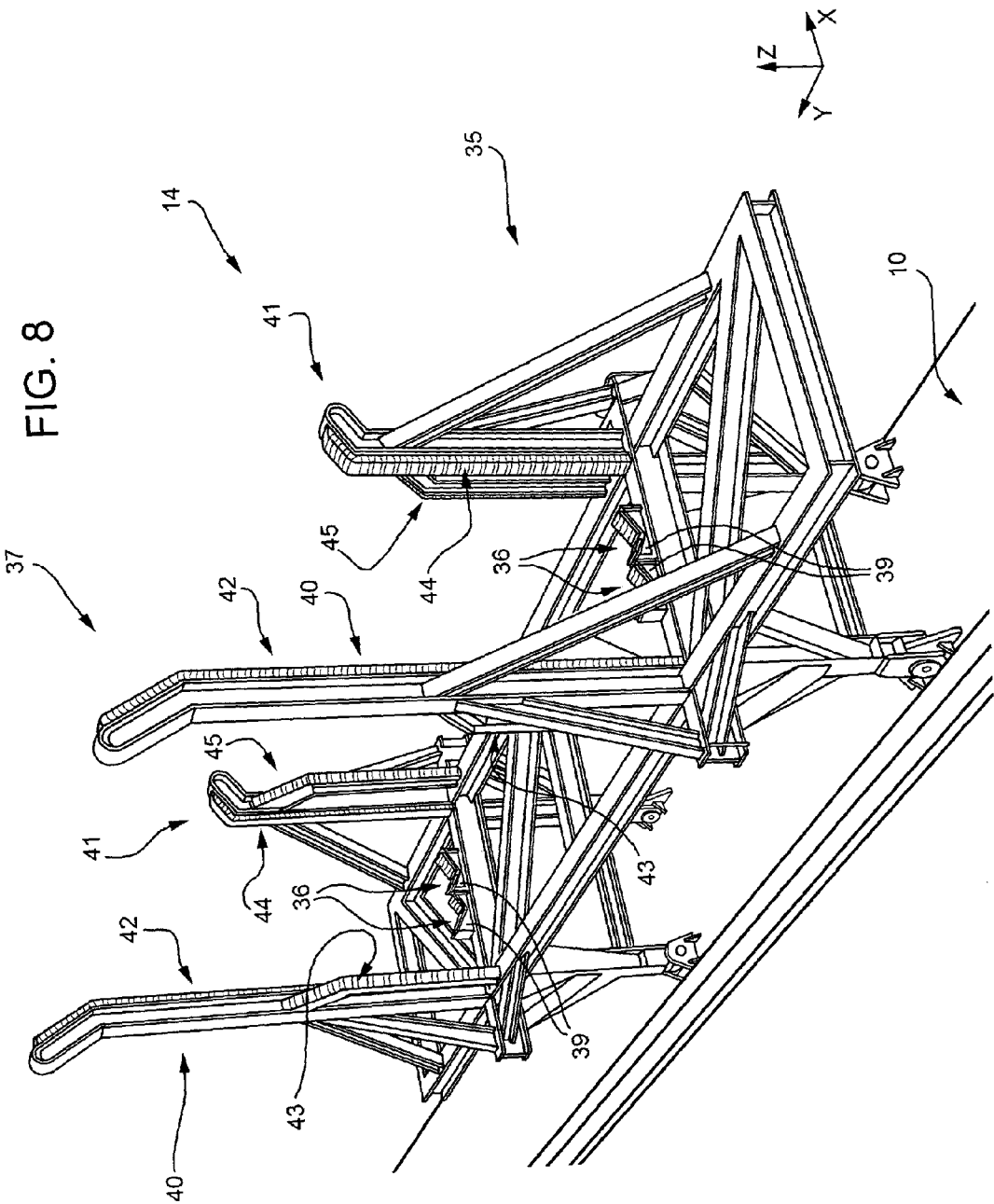
FIG. 8 shows a larger-scale view in perspective, with parts removed for clarity, of a detail of the FIG. 2 carrier vessel.
Figure 9:
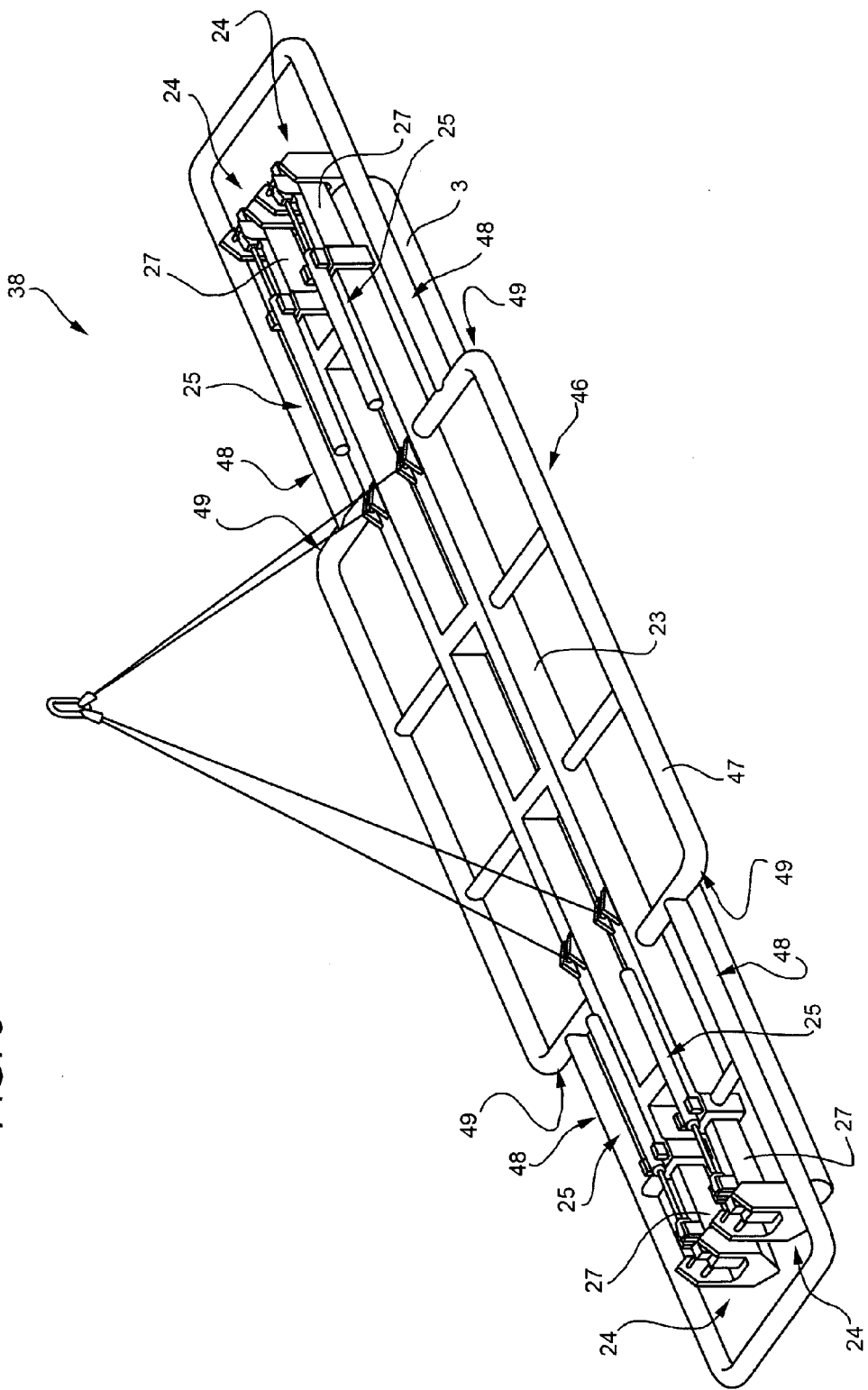
FIG. 9 shows a view in perspective, with parts removed for clarity, of a gripping device of a crane on the laying vessel.
Figure 10:
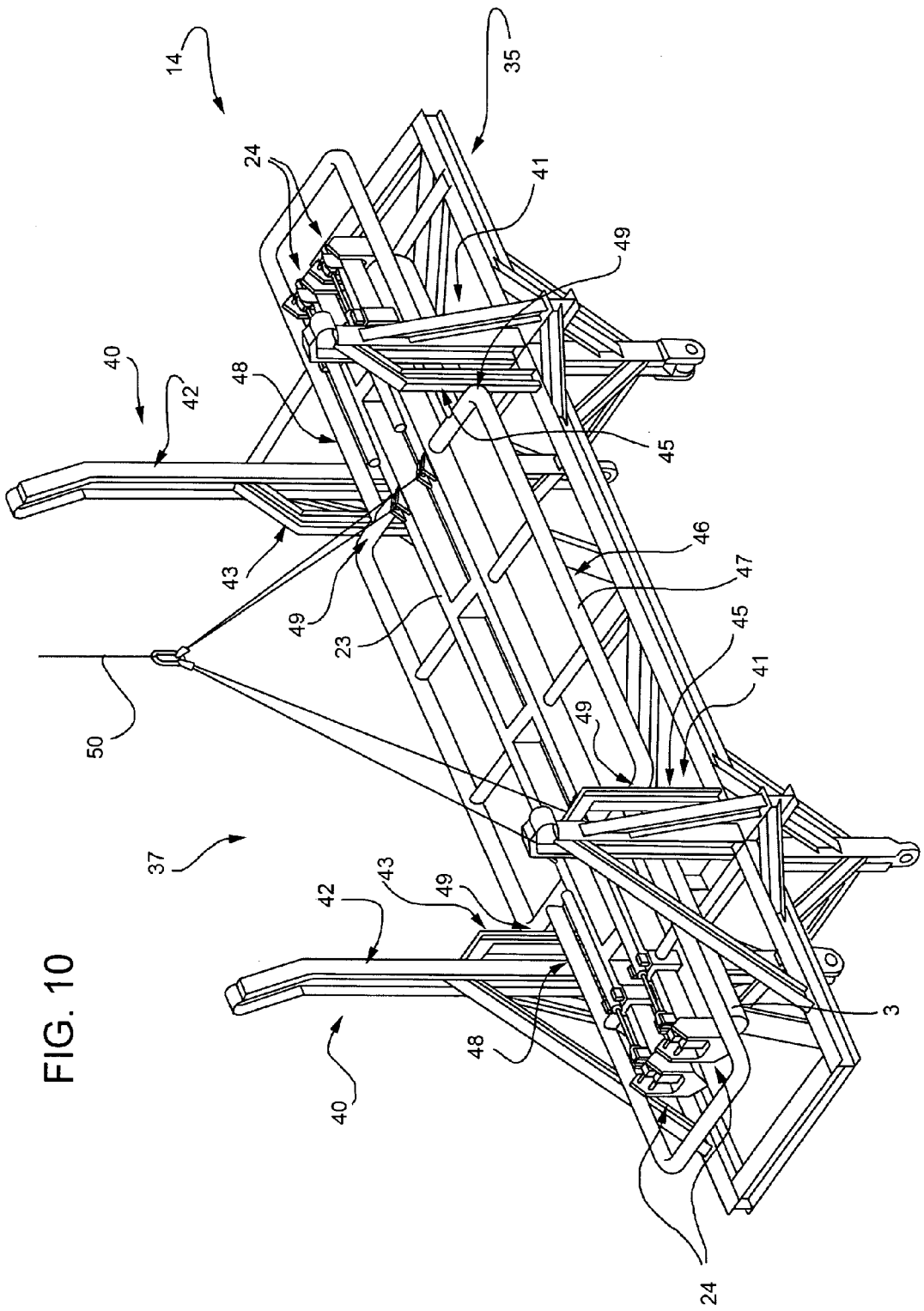
FIG. 10 shows a view in perspective, with parts removed for clarity, of the FIG. 9 gripping device at one pipe gripping stage at the transfer station.

With reference to FIG. 8, manipulator 13 picks up two pipes 3 at a time, and deposits them temporarily in respective transfer station 14, from where they are eventually removed by one of cranes 7 on laying vessel 1 (FIG. 1). Each transfer station 14 comprises a frame 35, which defines two seats 36 for respective pipes 3, and a guide system 37 for positioning a gripping device 38 of crane 7 (FIGS. 9 and 10). With reference to FIG. 8, seats 36 are substantially defined by cradles 39, and guide system 37 substantially comprises two pairs of uprights 40 and 41. More specifically, uprights 40 and 41 form the four corners of a rectangle, and uprights 40 are aligned along one side of the rectangle and are taller than uprights 41. Each upright 40 defines a track 42 facing an upright 41, and a track 43 facing the other upright 40. And likewise, each upright 41 defines a track 44 facing an upright 40, and a track 45 facing the other upright 41. Tracks 42, 43, 44, 45 comprise respective straight parallel portions, and respective sloping top-end portions. Tracks 42 are longer than tracks 44, which are longer than tracks 43 and 45. In an xyz cartesian system, tracks 42 and 44 locate gripping device 38 (FIG. 9) with respect to the X axis, and tracks 43 and 45 locate gripping device 38 (FIG. 9) with respect to the Y axis.

The difference in the height of tracks 42 and 44 also allows gripping device 38 (FIG. 9) to be inserted into transfer station 14 along the X axis, and not only along the Z axis. The fact that tracks 43 and 45 are shorter in height than tracks 42 and 44 allows gripping device 38 (FIG. 9) to be positioned first along the X axis and then along the Y axis.

Accordingly, as shown in FIG. 9, gripping device 38 substantially comprises the same structural parts as gripping device 16, and is equipped with a locating frame 46 fitted to elongated structure 23.

Besides cooperating with guide system 37, locating frame 46 also protects gripping device 38 and pipes 3 from accidental shock.

In the example shown, locating frame 46 is defined by a flat tubular structure having a contoured outer edge 47 and comprising eight locating areas 48 and 49. Areas 48 are designed to cooperate with tracks 42 and 44, and areas 49 to cooperate with tracks 43 and 45. Each area 48 is parallel to elongated structure 23 of gripping device 16, and each area 49 is perpendicular to elongated structure 23 and adjacent to a respective area 48.

FIG. 10 shows the gripping device connected to a cable 50 of crane 7 and inside guide device 37. Transfer station 14 is equipped with a feed station (not shown), actuators 25 for operating gripping device 38, and an automatic connecting device (not shown) for connecting gripping device 38 to the feed station (not shown).

In an alternative embodiment (not shown) of the present invention, the gripping member actuators are eliminated, and the gripping device is a passive type, in which the gripping members are operated by actuators fitted inside the transfer station.

With reference to FIG. 1, laying vessel 1 also comprises an unloading station 51 substantially identical to transfer station 14, and where pipes 3 are unloaded pending stacking in storage area 8.

Transferring pipes 3 from carrier vessel 2 to laying vessel 1 substantially comprises transferring pipes 3 from hold 11 to transfer station 14 using manipulator 13. Pipes 3 may be extracted from the hold one by one or, as described, in parallel pairs; in which case, pipes 3 are arranged in orderly, equally spaced manner inside hold 11. Because manipulator 13 and transfer station 14 are both located on carrier vessel 2, and pitching and rolling of carrier vessel 2 has no effect on transfer of pipes 3 from the hold to transfer station 14, these operations can be automated, with no assistance from workers inside the hold or in the vicinity of transfer station 14.

As shown in FIG. 10, guide system 37 cooperates with gripping device 38 at transfer station 14 to guide gripping device 38 into a given position to automatically grip pipes 3 housed temporarily in seats 36 of transfer station 14. Despite gripping device 38 being suspended from cable 50 and therefore subject to swinging, guide system 37 is still able to set gripping device 38 into a given position in which to grip pipes 3. So, despite crane 7 being installed on laying vessel 1, and the inevitable relative movement between transfer station 14 and crane 7, gripping device 38 can therefore be positioned at the transfer station with substantially no labour required.

Once pipes 3 are gripped by gripping device 38, crane 7 transfers them to laying vessel 1 and releases them into unloading station 51.

Figure 11:
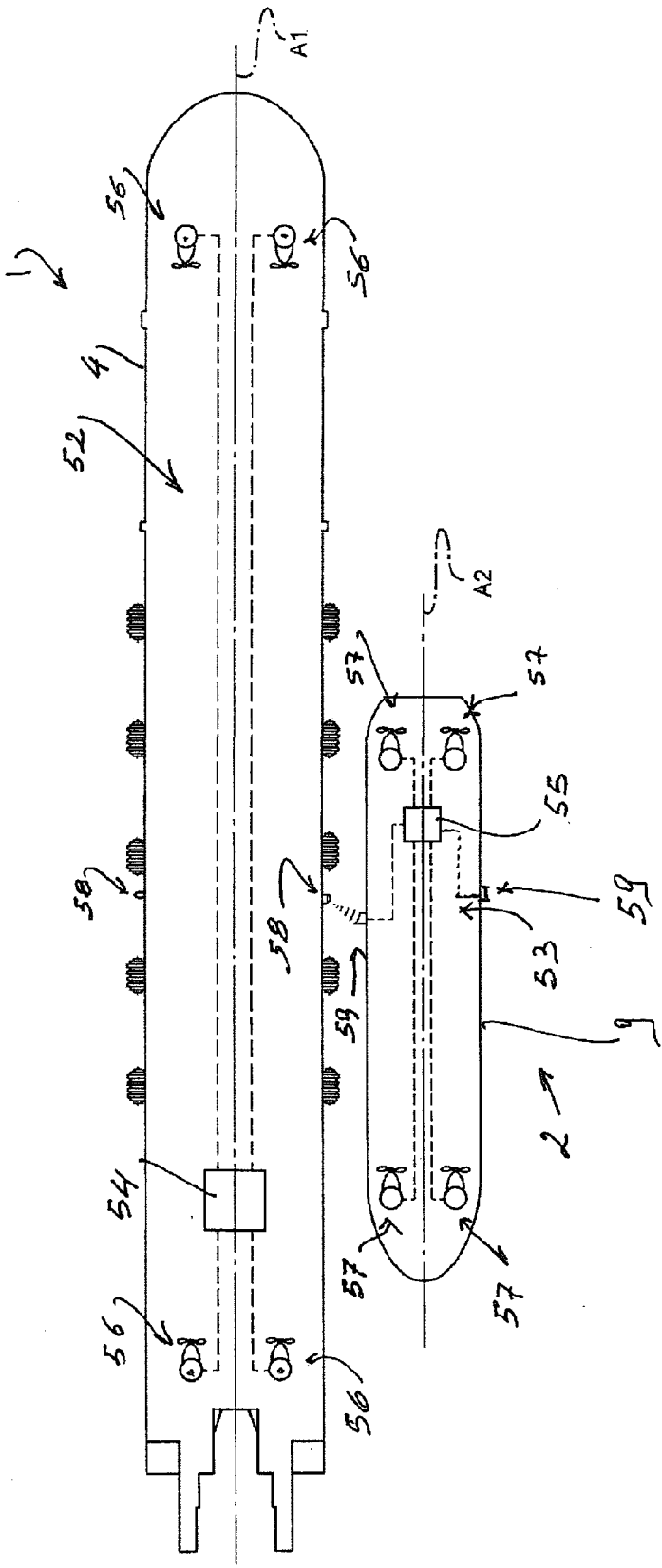
FIG. 11 shows a schematic plan view, with parts removed for clarity, of a carrier vessel alongside an underwater-pipeline laying vessel.

With reference to FIG. 11, laying vessel 1 and carrier vessel 2 are equipped with respective dynamic positioning systems 52, 53 comprising respective control units 54, 55 and respective numbers of thrusters 56, 57. Each dynamic positioning system 52, 53 comprises sensors and controls (not shown) for determining the position and/or course of the respective vessel.

Laying vessel 1 comprises two reference points 58 on the above-water part—in the example shown, on the opposite sides—of floating structure 4. And dynamic positioning system 53 comprises sensors 59 for detecting reference points 58 and enabling dynamic positioning system 53 to position and maintain the position of carrier vessel 2 with respect to laying vessel 1 during transfer, so that crane 7 of laying vessel 1 and transfer station 14 of carrier vessel 2 remain in the same relative position.

Carrier vessel 2 can be moved closer to laying vessel 1 and its position maintained both manually and automatically. In manual mode, thrusters 57 are pilot-controlled using a joystick (not shown) on the basis of information from sensors 59.

The present invention provides for highly automated pipe transfer to improve safety and enable transfer even in rough water conditions.

Moreover, transfer station 14, gripping device 38, and manipulator 13 can be supplied in the form of a kit to convert existing vessels to operate in accordance with the transfer method described.

Clearly, changes may be made to the embodiment of the present invention described without, however, departing from the protective scope of the accompanying Claims.

The invention claimed is:

1. A method of transferring pipes from a carrier vessel to a laying vessel, the method comprising:
   gripping the pipes in a hold of the carrier vessel using a manipulator mounted on the carrier vessel;
   releasing the pipes from the manipulator, in a given position, inside a transfer station on the carrier vessel; and
   cooperatively engaging a gripping device connected to a crane on the laying vessel with the transfer station on the carrier vessel to guide the gripping device into said given position at the transfer station.

2. A method as claimed in claim 1, wherein engaging the gripping device connected to the crane on the laying vessel with the transfer station on the carrier vessel to guide the gripping device into said given position at the transfer station comprises:
   positioning the gripping device with respect to a first axis by means of four parallel first tracks; and
   positioning the gripping device with respect to a second axis by means of four parallel second tracks.

3. A method as claimed in claim 2, wherein engaging the gripping device connected to the crane on the laying vessel with the transfer station on the carrier vessel to guide the gripping device into said given position at the transfer station further comprises positioning the gripping device first along the first axis, and then along the second axis.

4. A method as claimed in claim 1, wherein the manipulator comprises a knuckle-boom crane configured to reach any point in the hold.

5. A method as claimed in claim 1, wherein the manipulator comprises a knuckle-boom crane and a further gripping device; and
   wherein gripping the pipes in the hold comprises positioning the further gripping device at any point in the hold by means of the knuckle-boom crane.

6. A method as claimed in claim 5, wherein gripping the pipes in the hold comprises:
   positioning the further gripping device over and parallel to at least one of the pipes; and
   inserting gripping members of the gripping device at least partly inside the at least one of the pipes.

7. A method as claimed in claim 6, further comprising, before gripping the at least one of the pipes, removing plugs from opposite ends of the at least one the pipes by means of unplugging devices associated with the gripping members; each gripping member being associated with an unplugging device movable between a work position and a rest position.

8. A method as claimed in claim 1, further comprising:
   simultaneously gripping a number of parallel pipes in the hold; and
   simultaneously positioning said number of parallel pipes at the transfer station by means of said manipulator.

9. A method as claimed in claim 1, further comprising positioning and maintaining the carrier vessel in a given position with respect to the laying vessel by means of a dynamic positioning system.

10. A kit for transferring pipes from a carrier vessel to a laying vessel, the kit comprising:
    a gripping device for gripping the pipes and connectable to a crane on the laying vessel;
    a transfer station on a weather deck of said carrier vessel for housing the pipes temporarily in a given position, wherein the transfer station is configured to cooperatively engage the gripping device and to guide the gripping device into said given position; and
    a manipulator mounted on the carrier vessel and designed to grip the pipes in a hold of the carrier vessel and to release the pipes in said given position at the transfer station.

11. A kit as claimed in claim 10, wherein the transfer station comprises a guide system for positioning the gripping device with respect to said given position.

12. A kit as claimed in claim 10, wherein the guide system comprises:

four parallel first tracks for positioning the gripping device with respect to a first axis; and four parallel second tracks for positioning the gripping device with respect to a second axis.

13. A kit as claimed in claim 12, wherein the first tracks are higher than the second tracks.

14. A kit as claimed in claim 12, wherein two of the first tracks are higher than the other two first tracks.

15. A system for transferring pipes from a carrier vessel to a laying vessel, the system comprising:

a carrier vessel having a hold for housing pipes;

a manipulator mounted on the carrier vessel for gripping the pipes in the hold of the carrier vessel and releasing the pipes, in a given position, inside a transfer station located on the carrier vessel; and a laying vessel having a crane, the crane comprising a gripping device configured to cooperatively engage the transfer station such that the transfer station guides the gripping device into the given position at e transfer station.

16. A system as claimed in claim 15, wherein the transfer station comprises:

four parallel first tracks for positioning the gripping device with respect to a first axis; and four parallel second tracks for positioning the gripping device with respect to a second axis.

17. A system as claimed in claim 15, wherein the manipulator comprises a knuckle-boom crane configured to reach any point in the hold.

18. A system as claimed in claim 15, wherein the manipulator comprises:

a knuckle-boom crane; and a further gripping device configured to be positioned at any point in the hold for gripping the pipes.

19. A system as claimed in claim 18, wherein the further gripping device comprises gripping members configured to be inserted at least partly inside at least one of the pipes.

20. A system as claimed in claim 19, wherein the further gripping device further comprises unplugging devices for removing plugs from opposite ends of the at least one of the pipes before gripping the at least one of the pipes; each gripping member being associated with an unplugging device movable between a work position and a rest position.

21. A system as claimed in claim 15, wherein the manipulator comprises a number of gripping devices configured to simultaneously grip a number of parallel pipes in the hold and to simultaneously position the number of pipes at the transfer station.

22. A system as claimed in claim 15, wherein the carrier vessel comprises a dynamic positioning system for positioning and maintaining the carrier vessel in a given position with respect to the laying vessel.

* * * * *